Jan. 27, 1970   E. S. HADAWAY   3,491,536
BEARING ASSEMBLY
Filed June 3, 1968   2 Sheets-Sheet 1

Inventor
EDWARD STAFFORD HADAWAY
By Cushman, Darby & Cushman
Attorneys

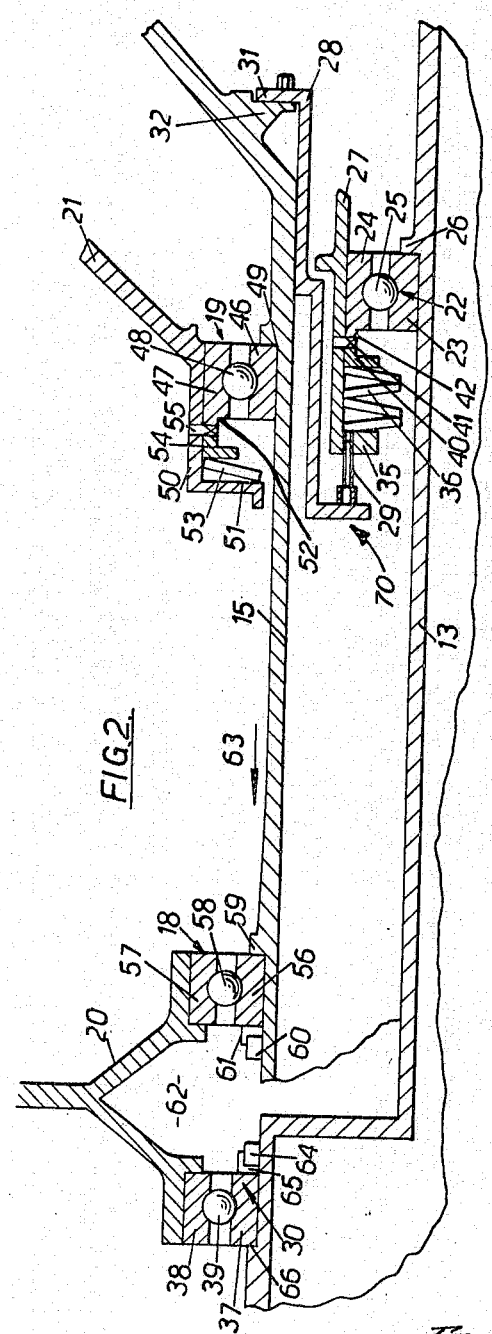

United States Patent Office 3,491,536
Patented Jan. 27, 1970

3,491,536
BEARING ASSEMBLY
Edward Stafford Hadaway, Holbrook, Derby, England, assignor to Rolls-Royce Limited, Derby, England, a British company
Filed June 3, 1968, Ser. No. 734,036
Claims priority, application Great Britain, June 23, 1967, 29,226/67
Int. Cl. F02c 7/20, 7/02; F16c 35/06
U.S. Cl. 60—39.31   11 Claims

ABSTRACT OF THE DISCLOSURE

A bearing assembly, e.g. in a gas turbine engine, for two relatively rotatable, relatively axially movable concentric shafts, the shafts carrying corresponding races of first and second bearings, a load-imparting device being arranged to simultaneously impart oppositely directed loads to predetermined races of the bearings.

---

Figure 1:
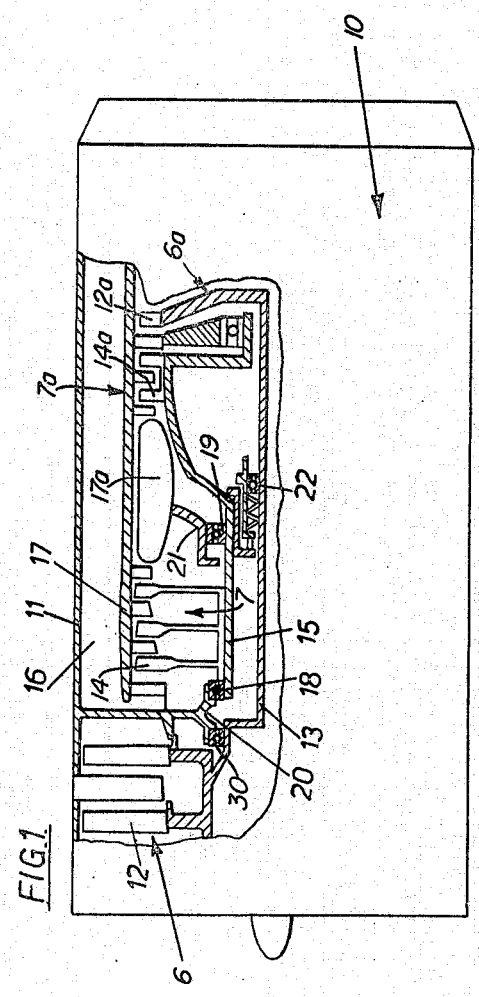

This invention concerns a bearing assembly, and although not so restricted, is particularly suitable for use on a gas turbine engine.

According to the present invention, there is provided a bearing assembly having first and second bearings each comprising inner and outer races with rolling elements therebetween, at least one pair of corresponding races of the first and second bearings being respectively carried by radially spaced apart relatively rotatable members which are relatively movable axially, and a load-imparting device arranged simultaneously to impart oppositely directed loads to predetermined races of the first and second bearings.

By way of definition, the radially inner races of the first and second bearings constitute one pair of corresponding races, and the radially outer races of the first and second bearings constitute another pair of corresponding races.

The load-imparting device preferably imparts a load to one of the said predetermined races by way of radially resilient structure which is disposed between the relatively rotatable members.

A corresponding race may constitute one of the predetermined races, the load-imparting device imparting a load to the one of the relatively rotatable members which carries the corresponding race, the aforementioned relatively rotatable member imparting the load to the corresponding race.

The said one relatively rotatable member may carry a race of a third bearing, one of the races of the third bearing being loaded by a second load-imparting device in a direction opposite to and with a load smaller than that to which the said one relatively rotatable member is subjected by the first-mentioned load-imparting device.

Another relatively rotatable member may carry, in addition to one of the predetermined races, a race of a fourth bearing, the load imparted to the one predetermined race being transmitted by another relatively rotatable member to the race of the fourth bearing.

The or each load-imparting device may comprise at least one resilient member, e.g. a spring washer.

At least one of the said bearings may be provided with means for preventing rotation, while permitting axial movement, of a said race.

In another aspect the invention provides a bearing assembly having first and second bearings each comprising radially inner and radially outer races with rolling elements therebetween, a plurality of coaxial relatively rotatable relatively axially movable members, corresponding races of the first and second bearings being carried by different coaxial members, a load-imparting device arranged to impart simultaneously oppositely directed loads to a race of the first bearing and to a race of the second bearing.

The invention also comprises a gas turbine engine having a bearing assembly as set forth above. Thus each of the said relatively rotatable members may carry a compressor and turbine of the engine.

The gas turbine engine may be a vertical lift engine having a thrust/weight ratio of at least 12:1.

The invention is illustrated, merely by way of example, in the accompanying drawings, in which:

FIGURE 1 is a diagrammatic representation, partly in section, of a gas turbine engine having a bearing assembly in accordance with the present invention, and FIGURE 2 is a broken-away view of a part of the structure of FIGURE 1 to a larger scale.

In FIGURE 1 there is shown a by-pass gas turbine engine which may be a vertical lift engine having a thrust/weight ratio of at least 12:1 and preferably at least 16:1. The engine has a casing 11 within which there is disposed a low pressure compressor 6 having a bladed rotor 12 which is mounted on a shaft 13. The shaft 13 also carries a bladed rotor 12a of a low pressure turbine 6a. The engine has a high pressure compressor 7 having a bladed rotor 14 which is mounted on a shaft 15. The shaft 15 also carries a bladed rotor 14a of a high pressure turbine 7a, the shaft 15 being mounted concentrically about and radially spaced from a portion of the shaft 13. The shafts 13, 15 are both relatively rotatable and relatively movable axially.

The engine 10 has a by-pass passage 16 which receives part of the air compressed in the low pressure compressor 6 and which is defined between the engine casing 11 and an inner wall 17. Conventional combustion equipment 17a receives air from the high pressure compressor 7.

The shaft 15 is mounted within first and third bearings 18, 19 respectively which are respectively supported from the engine casing 11 by means of fixed wall structure 20, 21, the said portion of the shaft 13 being mounted concentrically within shaft 15 by means including second and fourth bearings 22 and 30. The bearings 18, 19, 22, 30 respectively may be rigid deep groove ball bearings respectively.

The second bearing 22 comprises an inner race 23 which is mounted on the shaft 13, an outer race 24, and balls 25 therebetween. A shoulder 26 is provided on the shaft 13 to transmit axial loads to the bearing 22. The outer race 24 is slidably mounted for axial movement in a sleeve 27 which is in turn radially flexibly attached to a further resilient sleeve 28 by means of a squirrel cage comprising a plurality of angularly spaced apart axially extending rods 29. The sleeve 28 is radially resilient and together with the rods 29 forms a radially resilient structure 70. The sleeve 28, which is disposed between the shafts 13, 15 has, at its downstream end, a flange 31 which is bolted to an inwardly extending flange 32 of the shaft 15.

The sleeve 27 has a radially inwardly extending flange 35. Between the flange 35 and the outer race 24 of the bearing 22 are four annular spring washers 36 defining a first load-imparting device which imparts an axial load to the outer race 24 via a spacer ring 40. An equal and opposite reaction load is imparted to the flange 35, and thence to the shaft 15. The outer race 24 of bearings 22 has a plurality dogs 42 extending axially therefrom and defining a plurality of axially extending slots therein in which pins 41 fixed in the sleeve 27 extend radially inwardly. The outer race 24 is prevented from rotating relative to the sleeve 27 as the pins 41 bear against the sides of the slots defined by the dogs 42. However, the outer race 24 may slide axially relative to the sleeve 27 as the slots of the dogs 42 may move axially with respect to the pins 41. The spacer ring 40 abuts the ends of the dogs 42.

The fourth bearing 30 has an inner race 37, an outer race 38 and balls 39 therebetween. The inner race is axially located on shaft 13 by means of a shoulder 66, a ring nut 64 and a locking washer 65. The load imparted to the race 24 of bearing 22 is transmitted via the balls 25, and the inner race 23 thereof to the shaft 13. The shaft in turn transmits this load to the inner race 37 of bearing 30, which is thus permanently preloaded with a load equal to that imparted to bearing 22.

The third bearing 19 has an inner race 46, an outer race 47, and balls 48 therebetween. The inner race 46 is mounted on the shaft 15 against a shoulder 49, and thereby receives the reaction load from the spring washers 36.

The outer race 47 is slidably mounted for axial movement in a cylindrical portion 50 of the wall structure 21. The portion 50 has a radially inwardly extending flange 51, and there is disposed between the flange 51 and the outer race 47 an annular spring washer 53 defining a second load-imparting device which imparts a load in a downstream direction on the outer race 47 via a spacer ring 54. This load acts in opposition to the aforementioned reaction load imparted by the spring washers 36 to the inner race 46 via the shaft 15.

The outer race 47 of bearing 19 has a plurality of dogs 52 extending axially therefrom and defining axially extending slots therebetween. A plurality of pins 55 fixed in the portion 50 extend radially inwardly into the slots between the dogs 52. The outer race 47 is thus prevented from rotating by engagement of the pins 55 with the walls of the slots but may slide axially in the portion 50 as the slots can move axially on the pins 55. The spacer ring 54 abuts the ends of the dogs 52.

The bearing 18 has an inner race 56, an outer race 57, and balls 58 therebetween. The inner race 56 is mounted on the shaft 15 and is axially located thereon by means of a shoulder 59, ring nut 60 and locking washer 61. The outer race 57 is mounted in the wall structure 20 against a flange 62 thereof.

The spring washers 36 and 53 are such that the load imparted by spring washers 36 is greater than that imparted by spring washer 53. Thus, when the shafts 13 and 15 are stationary, shaft 15 is urged upstream, i.e. in the direction shown by arrow 63. Shaft 13 is, of course, urged in the opposite direction.

The flanges 51, 62 and the shoulders 49, 59 are so arranged that when the shaft 15 is urged in the direction of the arrow 63, the races 56, 57 and the balls 58 of the bearing 18 contact each other, and the bearing 18 thus becomes preloaded before the outer race 47 of bearing 19 has been moved far enough to completely compress the spring washer 53. The load imparted to bearing 18 is thus the load developed by the spring washers 36 minus the load developed by the spring washer 53.

The spring washers 36 constituting the first load-imparting device impart a permanent preload in opposite directions to predetermined races 24, 56 of two widely separated first and second bearings 18 and 22, the corresponding races [inner races 56, 23] of which are respectively carried by respective radially spaced apart relatively rotatable shafts 15, 13 which are relatively movable axially, while the second load-imparting device constituted by the spring washer 53 imparts a permanent preload to the outer race 47 of the third bearing 19. The preload on race 24 is also transmitted via shaft 13 to the inner race 37 of fourth bearing 30. Accordingly, slipping or skidding between the balls and races of the bearings 18, 19, 22 and 30 is prevented.

Furthermore, when the invention is used in a vertical lift engine, the permanently imparted loads reduce the effect on the thrust bearings of vibration transmitted to the engine while it is not in use. Such vibration occurs during wing-borne flight of a VTOL aircraft, and is transmitted from the forward propulsion engines via the aircraft structure. Such vibration has been found to damage the thrust bearings by inducing oscillatory hammering movements between the balls and races, resulting in pitting and scarring of the latter. The permanent imparted loads hold the races and balls in contact, preventing such hammering.

If desired, the spring washers can be replaced by other types of resilient device, for example, helical springs maintained in angularly-spaced apart relationship by means of a cage.

Alternatively, the resilient device could be a flexible container or bellows containing fluid under pressure, the internal pressure determining the imparted load on the bearings.

Although the invention has been described with reference to a by-pass engine, it will be appreciated that it is equally applicable to any engine having a plurality of concentric, relatively rotatable shafts.

I claim:

1. A gas turbine engine comprising:
   a compressor means, combustion means and turbine means in flow sequence, said compressor means and said turbine means each comprising bladed rotor means, a plurality of radially spaced-apart relatively rotatable members each carrying a respective bladed rotor means of said compressor means and said turbine means, said relatively rotatable members being relatively movable axially with respect to each other, a bearing assembly having first and second bearings each comprising inner and outer races with rolling elements therebetween, a pair of corresponding races of said first and second bearings being respectively carried by respective relative rotatable members, and a load-imparting device simultaneously imparting oppositely directed loads to predetermined races of said first and second bearings.

2. An engine as claimed in claim 1 in which the engine is a vertical life engine having a thrust to weight ratio of at least 12:1.

3. A bearing assembly having first and second bearings, each comprising radially inner and radially outer races with rolling elements therebetween, a plurality of coaxial relatively rotatable relatively axially movable members, the inner races of said first and second bearings being carried by different members of said coaxial members, the outer races of the first and second bearings also being carried by different members of said coaxial members, a load-imparting device arranged to impart simultaneously oppositely directed loads to one race of said races of said first bearing and to one race of said races of said second bearing.

4. A bearing assembly having first and second bearings each comprising inner and outer races with rolling elements therebetween, a plurality of radially spaced apart relatively rotatable members which are relatively movable axially, at least one pair of corresponding races of the first and second bearings being coaxial and of different diameters and respectively carried by said radially spaced apart members, and a load-imparting device which simultaneously imparts oppositely directed loads to predetermined races of the first and second bearings.

5. An assembly as claimed in claim 4 comprising radially resilient structure which is disposed between the relatively rotatable members, the load-imparting device imparting a load to one of the said predetermined races by way of said structure.

6. An assembly as claimed in claim 4 in which at least one of the said bearings is provided with means to prevent rotation, while permitting axial movement, of a said race.

7. An assembly as claimed in claim 4 in which the load-imparting device comprises at least one resilient member.

8. An assembly as claimed in claim 7 in which the resilient member is a spring washer.

9. An assembly as claimed in claim 4, in which one of said corresponding races constitutes one of said predetermined races of said first and second bearings, said load-imparting devices imparting a load to one of said relatively rotatable members which carries said one of said corresponding races, said one of said relatively rotatable members imparting the load to said one of said corresponding races.

10. An assembly as claimed in claim 9, comprising a third bearing having inner and outer races with at least one of said races being carried by said one of said relatively rotatable members, a second load-imparting device, one of said inner and outer races of said third bearing being loaded by said second load-imparting device in a direction opposite to and with a smaller load than that to which said one of said relatively rotatable members is subjected to by said first mentioned load-imparting device.

11. An assembly as claimed in claim 10 comprising a fourth bearing having inner and outer races, the other of said relatively rotatable members carrying the other of said predetermined races and one of said inner and outer races of said fourth bearing, the load imparted to said one of said predetermined races being submitted by the other of said relatively rotatable races to the one of said inner and outer races of said fourth bearing.

References Cited

UNITED STATES PATENTS

| 3,118,593 | 1/1964 | Robinson et al. | |
| 3,147,913 | 9/1964 | Davies et al. | |
| 3,382,670 | 5/1968 | Venable | 60—39.16 XR |

FOREIGN PATENTS

| 746,254 | 3/1956 | Great Britain. |
| 1,025,195 | 4/1966 | Great Britain. |

MARK M. NEWMAN, Primary Examiner

A. D. HERRMANN, Assistant Examiner

U.S. Cl. X.R.

60—39.16; 230—116; 308—176, 189